United States Patent
Lee et al.

(10) Patent No.: US 7,257,729 B2
(45) Date of Patent: Aug. 14, 2007

(54) SYSTEM AND METHOD FOR PROCESSING AN INSTRUCTION ACCORDING TO A CLOCK AND ADJUSTING THE PHASE OF THE CLOCK ACCORDING TO THE INSTRUCTION

(75) Inventors: Chao-Cheng Lee, Hsin-Chu (TW); Yi-Chih Huang, Hsin-Chu (TW); Chi-Kung Kuan, Tao-Yuan Hsien (TW)

(73) Assignee: Realtek Semiconductor Corp., HsinChu (TW)

( * ) Notice: Subject to any disclaimer, the term of this patent is extended or adjusted under 35 U.S.C. 154(b) by 207 days.

(21) Appl. No.: 10/907,054

(22) Filed: Mar. 18, 2005

(65) Prior Publication Data

US 2005/0210307 A1   Sep. 22, 2005

(30) Foreign Application Priority Data

Mar. 22, 2004   (TW) ............................... 93107643 A

(51) Int. Cl.
*G06F 1/00*   (2006.01)
*G06F 5/06*   (2006.01)

(52) U.S. Cl. ..................................... 713/600; 713/500

(58) Field of Classification Search ................ 713/300, 713/322, 500, 501, 600; 331/45
See application file for complete search history.

(56) References Cited

U.S. PATENT DOCUMENTS

| | | | |
|---|---|---|---|
| 5,752,011 A * | 5/1998 | Thomas et al. | 713/501 |
| 5,978,925 A * | 11/1999 | Shiraishi et al. | 713/400 |
| 6,788,156 B2 * | 9/2004 | Tam et al. | 331/49 |
| 2003/0231069 A1 * | 12/2003 | Chiang et al. | 331/45 |
| 2004/0193929 A1 * | 9/2004 | Kuranuki | 713/322 |

\* cited by examiner

*Primary Examiner*—Thomas Lee
*Assistant Examiner*—Mark Connolly
(74) *Attorney, Agent, or Firm*—Winston Hsu

(57) ABSTRACT

A processor with an adjustable operating frequency and method thereof. The pipeline processor includes a clock providing module for providing a reference clock, and a processing core coupled to the clock providing module for processing a first instruction according to the reference clock. The clock providing module contains a multi-phase clock generator for generating a plurality of original clocks with different phases, and a phase selector for selecting an original clock to generate the reference clock according to the first instruction.

19 Claims, 3 Drawing Sheets

SYSTEM AND METHOD FOR PROCESSING AN INSTRUCTION ACCORDING TO A CLOCK AND ADJUSTING THE PHASE OF THE CLOCK ACCORDING TO THE INSTRUCTION

BACKGROUND OF INVENTION

1. Field of the Invention

The present invention relates to a processor, and more particularly, to a processor with an adjustable operating frequency and method thereof.

2. Description of the Prior Art

A processor is an essential component for a computer system. The processor fetches program instructions and data from system memories, executes related logical or arithmetical operations on fetched data according to the program instructions, and sends back operation results to the system memories. Normally, the performance of a processor is decided by measuring the time of processing a specific task or a program. The time of processing a program for the processor can be expressed as: (number of instructions contained in the program)*(clock period of each instruction)*(length of a clock period). Consequently, the performance of the processor is determined by various parameters when being designed. Pipeline structure is a system architecture that can accelerate the throughput of the processor. Under the pipeline structure, all the tasks of the instruction are divided into a series of steps, and each step is referred to as a pipeline stage.

For example, most processors divide the tasks of an instruction into an instruction fetch stage, a decode stage, an execution stage, and a write back stage, where the execution stage usually takes up most of the time. As a result, a system is generally designed to have a clock period which allows the processor to process complicated instructions in the execution stage where the bottleneck almost always resides. If the clock period is too short, an execution error or an execution failure may occur while processing an instruction requiring longer time.

SUMMARY OF INVENTION

It is therefore one objective of the present invention to provide a processor with an adjustable operating frequency and method thereof.

According to an embodiment of the present invention, a processor is disclosed. The processor includes a clock providing module for providing a reference clock, and a processing core coupled to the clock providing module for processing a first instruction according to the reference clock by pipeline methods. The clock providing module adjusts the reference clock according to the first instruction so as to determine an executing time that the processing core uses to process the first instruction.

According to another embodiment of the present invention, a method of processing a first instruction by use of a processor is disclosed. The method includes generating a reference clock, determining a class of the first instruction, selectively adjusting the reference clock according to the class of the first instruction, and executing the first instruction according to the reference clock.

According to yet another embodiment of the present invention, a processor is disclosed. The processor comprises a clock providing module for providing a reference clock according to a clock control signal; and a processing core, coupled to the clock providing module, for processing a first instruction according to the reference clock; wherein the clock control signal corresponds to the first instruction.

According to still another embodiment of the present invention, a processor is disclosed. The processor comprises a clock generator for providing a reference clock; and a processing core, coupled to the clock generator, for processing instructions according to the reference clock; wherein when the processing core processes a first instruction, the clock generator provides the reference clock having a first characteristic, and when the processing core processes a second instruction, the clock generator provides the reference clock having a second characteristic.

These and other objectives of the present invention will no doubt become obvious to those of ordinary skill in the art after having read the following detailed description of the preferred embodiment that is illustrated in the various figures and drawings.

DETAILED DESCRIPTION

Figure 1:
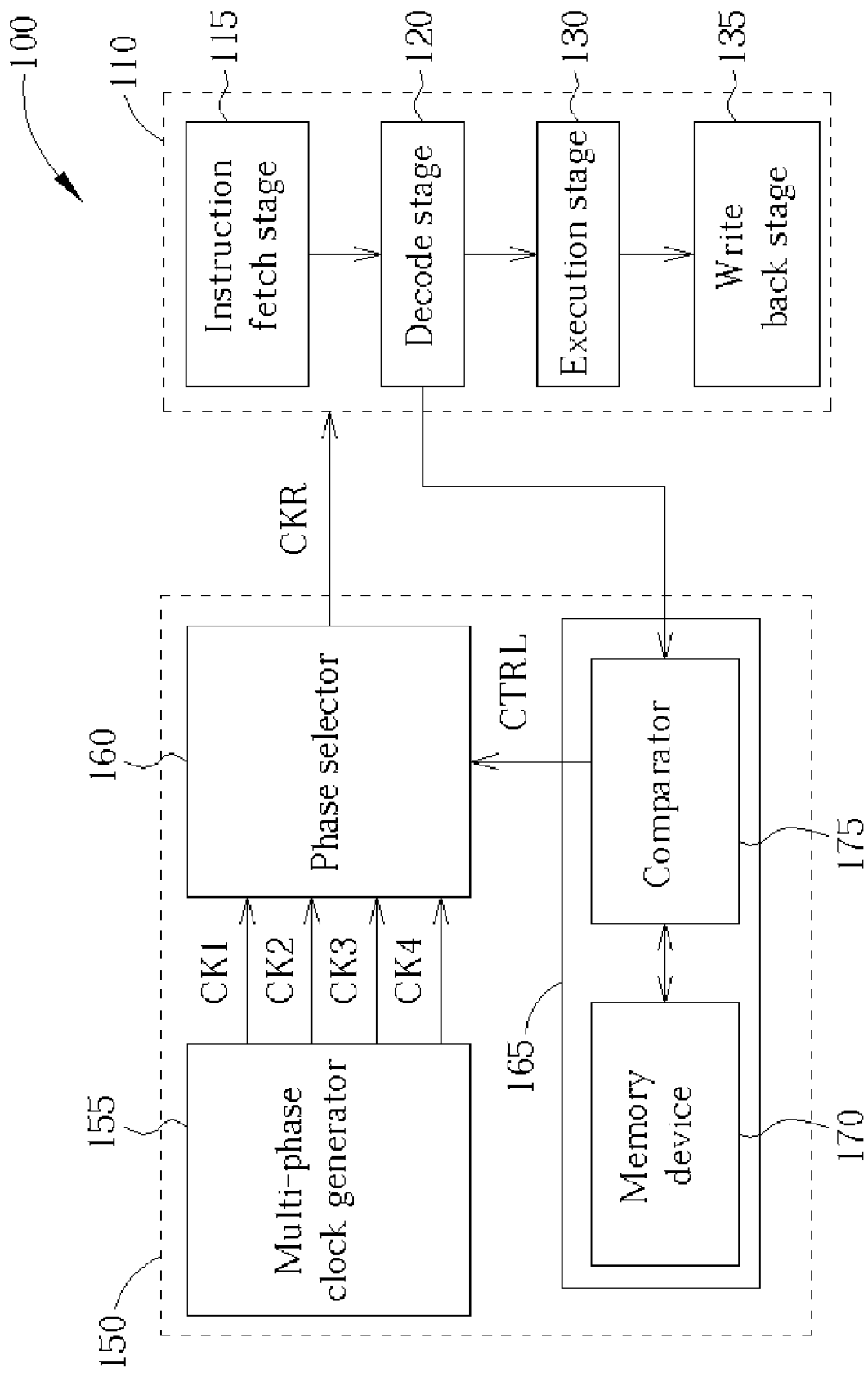
FIG. 1 is a schematic diagram of a processor according to an embodiment of the present invention.

FIG. 1 is a schematic diagram of a processor 100 according to an embodiment of the present invention. As shown in FIG. 1, the processor 100 functionally includes a processing core 110 and a clock providing module 150. The processing core 110 logically includes an instruction fetch stage 115, a decode stage 120, an execution stage 130, and a write back stage 135. The hardware architecture and operation method for implementing the above processing core 110 are well known in the art, and thus redundant descriptions are not given herein. In addition, the listed stages merely serve as examples of the processing core 110, and are not aimed to be limiting. The clock providing module 150, used to provide a reference clock CKR for the processing core 110, includes a multi-phase clock generator 155, a phase selector 160, and a determination module 165. For easy illustration and understanding, the multi-phase clock generator 155, which can generate four original clocks CK1, CK2, CK3, and CK4, is selected as an example. However, the number of the original clocks does not serve as a limitation to the present invention.

Assume that the processor 100 requires an executing time of 7 µs in the execution stage 130 for processing most instructions, and only a few instructions require an executing time of 8 µs. On the premise that only a single operating frequency is used, the processor 100 can only reach the operating frequency of 125 MHz in order to execute the bottleneck instructions (i.e. the instructions which require 8 µs to be executed). On the contrary, if the processor 100 executes all the instructions with a high operating frequency larger than 125 MHz, execution errors or execution failures occur when dealing with the instructions which require 8 µs of execution time.

According to this embodiment of the invention, however, the operating frequency of the four original clocks CK1, CK2, CK3, and CK4 can be 133 MHz, and each of the four original clocks CK1, CK2, CK3, and CK4 has a phase 90 degrees behind that of the preceding original clock. Whenever a first instruction is decoded in the decode stage 120, the first instruction is delivered to the determination module 165. The determination module 165 includes a memory device 170 and a comparator 175. The memory device 170 is used to store a look up table containing entries of instructions and a corresponding control value for each instruction. The comparator 175 is used to compare the first instruction with the look up table, and to generate a control signal CTRL according to the control value corresponding to the matched instruction. As long as the determination module 165 ascertains that the executing time of the first instruction is not longer than 7 µs, the control signal CRTL then controls the phase selector 160 to select an original clock (e.g. CK1) as a reference clock CKR. In this case, the processor 100 executes the first instruction at the operating frequency of 133 MHz.

In the case that the executing time of the first instruction is longer than 7 µs, the comparator 175 of the determination module 165 will obtain a different control value. Accordingly, the control signal CRTL will control the phase selector 160 to continuously switch from an original clock currently in use (e.g., CK1) to another original clock (e.g., CK2), which has a phase lag from that of the clock currently in use, in order to provide more executing time (longer than 7 µs) for the first instruction. The technique of continuously switching from one original clock to another original clock having different phases in an attempt to in effect produce a longer clock is widely known as phase swallow technique, and is well known in the clock generating art.

Figure 2:
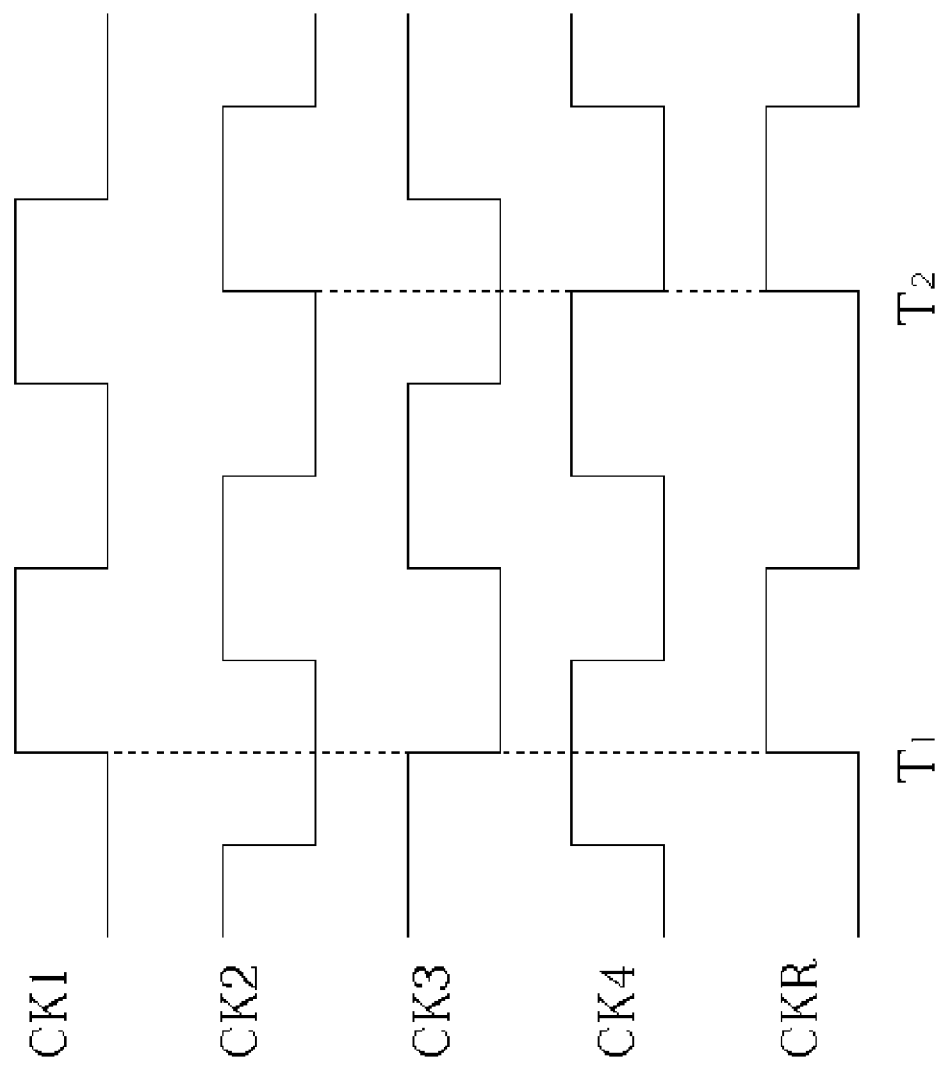
FIG. 2 is a schematic diagram illustrating how the phase selector selects different original clocks to provide the reference clock.

FIG. 2 is a schematic diagram illustrating how the phase selector 160 switches among different original clocks to provide the reference clock CKR. As shown in FIG. 2, while executing instructions having an executing time no longer than 7 µs, the processor 100 provides an original clock (e.g., CK1) as the reference clock CKR. As soon as the determination module 165 ascertains that the executing time of the first instruction is longer than 7 µs, the control signal CTRL will control the phase selector 160 to switch to a new original clock (e.g., CK2), which has a phase lag from the phase of the preceding original clock (e.g., CK1), to generate the reference clock CKR. Correspondingly, CK3 or CK4 can be instead of CK2, or subsequently, selected to implement different phase swallow effects, which provide for different executing times. In such a case, the processing core 110 can execute the first instruction within the period from T1 to T2 in the execution stage 130. In other words, the processing core 110 executes the first instruction in an operating frequency less than 133 MHz. If the executing time of the following instruction is again not longer than 7 µs, the phase selector 160 will keep on selecting the original clock CK2 as the reference clock CKR so that the operating frequency of the processing core 110 returns to 133 MHZ.

The multi-phase clock generator 155 can be a delay locked loop, and the phase selector 160 can be a multiplexer according to another embodiment of the present invention. The more original clocks with different phases the multi-phase clock generator 155 can generate, the more choices the phase selector 160 can make. Additionally, although the phase selector 160 selects an original clock having a phase lag from that of the preceding original clock in the aforementioned descriptions, the phase selector 160 can also select an original clock having a phase leading to that of the preceding original clock currently in use. Therefore, any other circuit architectures that can achieve the same functions as the multi-phase clock generator 155 fall within the scope of the present invention.

Figure 3:
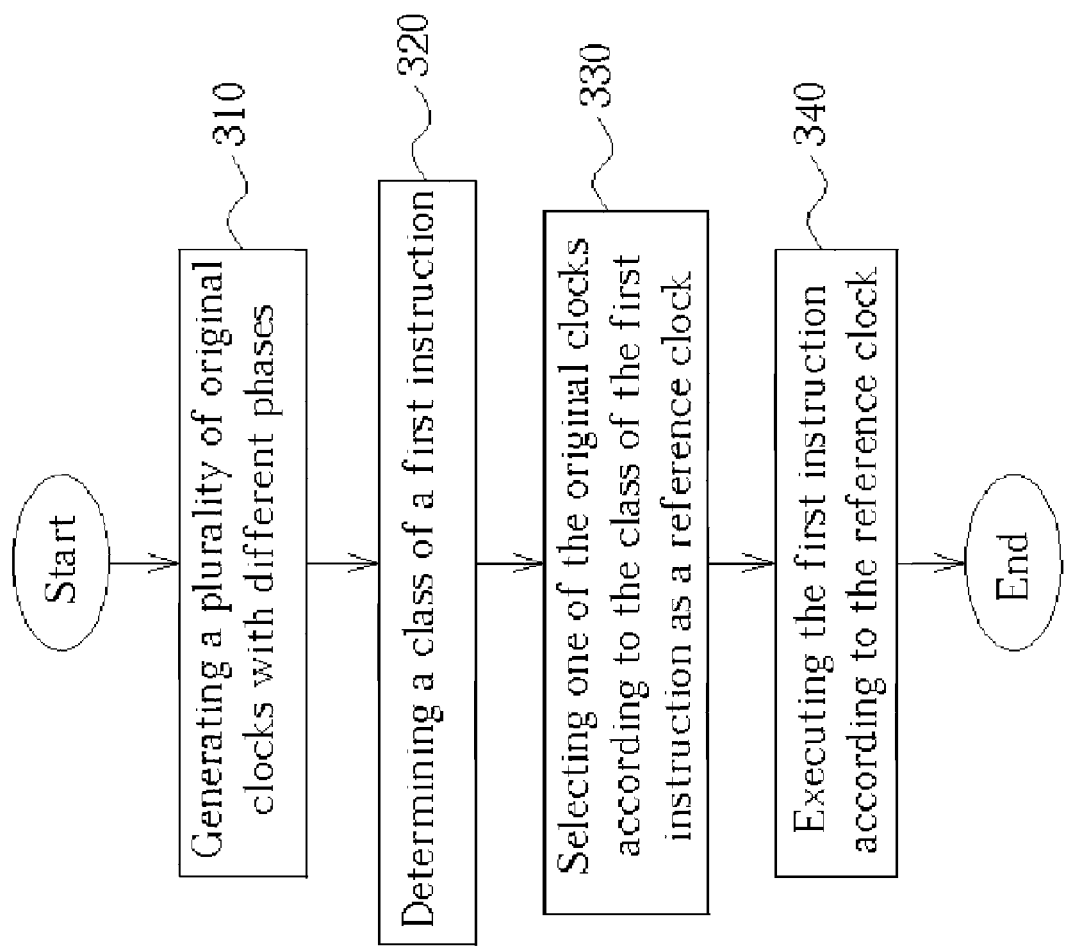
FIG. 3 is a flow chart of a method according to an embodiment of the present invention.

FIG. 3 is a flow chart of a method according to an embodiment of the present invention. As shown in FIG. 3, the method includes the following steps.

Step 310: generating a plurality of original clocks with different phases.

Step 320: determining a class of a first instruction;

Step 330: selecting one of the original clocks as a reference clock according to the class of the first instruction. In this step, there are two possibilities. One is that a first original clock is able to provide enough time to execute the first instruction, and in such a case the first original clock is fixed as the reference clock so that the processor can execute the first instruction according to the reference clock. The other is that the first original clock is not able to provide enough time for the processor to execute the first instruction, and in such a case the phase selector subsequently switches from the first original clock to a second original clock in generating the reference clock, such that the generated reference clock has a long enough period for the execution of the underlying instruction. It is worth noting that the phase of the second original clock generally falls behind that of the first original clock.

Step 340: executing the first instruction according to the reference clock.

In the above descriptions, the phase of the second original clock falls behind the phase of the first original clock, and thus the processor can execute different instructions, which require longer executing time, in different operation frequencies by utilizing the aforementioned phase swallow techniques.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A processor comprising:
   a clock providing module for providing a reference clock; and
   a processing core, coupled to the clock providing module, for processing a first instruction according to the reference clock;
   wherein the clock providing module adjusts a phase of the reference clock by utilizing phase swallowing techniques according to the first instruction so as to adjust a time period that the processing core uses to process the first instruction.

2. The processor of claim 1 wherein the clock providing module comprises:
   a multi-phase clock generator for generating a plurality of original clocks with different phases; and
   a phase selector, coupled to the multi-phase clock generator and the processing core, for selecting one of the plurality of original clocks according to the first instruction to generate the reference clock.

3. The processor of claim 2 wherein the multi-phase clock generator comprises a delay locked loop.

4. The processor of claim 2 wherein the phase selector comprises a multiplexer.

5. The processor of claim 1 wherein the processor further comprises a determination module, coupled to the processing core and the clock providing module, for controlling the clock providing module to adjust the reference clock according to a class of the first instruction.

6. The processor of claim 5 wherein the determination module comprises:
- a memory device for storing a look up table, the look up table comprising at least a field for recording a relation between classes and control signals; and
- a comparator, coupled to the memory device, for comparing the look up table with the first instruction so as to output a control signal for controlling the clock providing module to adjust a phase of the reference clock.

7. A method of processing a first instruction by use of a processor, the method comprising:
- generating a reference clock;
- determining a class of the first instruction;
- selectively adjusting the reference clock according to the class of the first instruction;
- executing the first instruction according to the reference clock; and
- generating a plurality of original clocks with different phases;
- wherein if the first instruction corresponds to a first class, a first original clock is selected to generate the reference clock, and if the first instruction corresponds to a second class, a second original clock is selected to generate the reference clock.

8. The method of claim 7 wherein the method further comprises:
- comparing the first instruction with a look up table to generate a control signal, and adjusting the reference clock according to the control signal.

9. The method of claim 7 wherein in the step of adjusting the reference clock, a phase of the reference clock is adjusted according to the class of the first instruction.

10. The method of claim 9 wherein in the step of adjusting the reference clock, phase swallowing techniques are adopted to adjust the phase of the reference clock.

11. The method of claim 7 wherein in the step of determining the class of the first instruction, an executing time of the first instruction is determined.

12. A processor comprising:
- a clock providing module for providing a reference clock according to a clock control signal, the clock providing module comprising:
- a multi-phase clock generator for generating a plurality of original clocks with different phases; and
- a phase selector for selecting one of the plurality of the original clocks according to the clock control signal to generate the reference clock; and
- a processing core, coupled to the clock providing module, for processing a first instruction according to the reference clock;
- wherein the clock control signal corresponds to the first instruction.

13. The processor of claim 12 wherein the clock providing module adjusts a phase of the reference clock according to the clock control signal.

14. The processor of claim 13 wherein the clock providing module adjusts the phase of the reference clock by phase swallowing techniques.

15. A processor comprising:
- a clock generator for providing a reference clock; and
- a processing core, coupled to the clock generator, for processing instructions according to the reference clock;
- wherein when the processing core processes a first instruction, the clock generator provides the reference clock having a first characteristic, when the processing core processes a second instruction, the clock generator provides the reference clock having a second characteristic, and the clock generator provides the reference clock having the second characteristic by utilizing phase swallowing techniques.

16. The processor of claim 15, wherein the reference clock having the first characteristic and the reference clock having the second characteristic possess substantially different average clock period.

17. The processor of claim 15, wherein the clock generator comprises:
- a multi-phase clock generator for generating a plurality of original clocks with different phases; and
- a phase selector for selecting among the plurality of the original clocks to generate the reference clock.

18. The processor of claim 15, further comprising:
- a determination module, coupled to the processing core and the clock generator, for controlling the clock generator to adjust the reference clock according to an instruction to be processed.

19. The processor of claim 18, wherein the determination module comprises:
- a memory device for storing a look up table, the look up table comprising at least a field for recording a mapping between a plurality of instruction classes and a plurality of control signals; and
- a comparator coupled to the memory device for comparing the instruction to be processed with the plurality of instruction classes so as to output a corresponding control signal for controlling the clock generator.

* * * * *